UNITED STATES PATENT OFFICE.

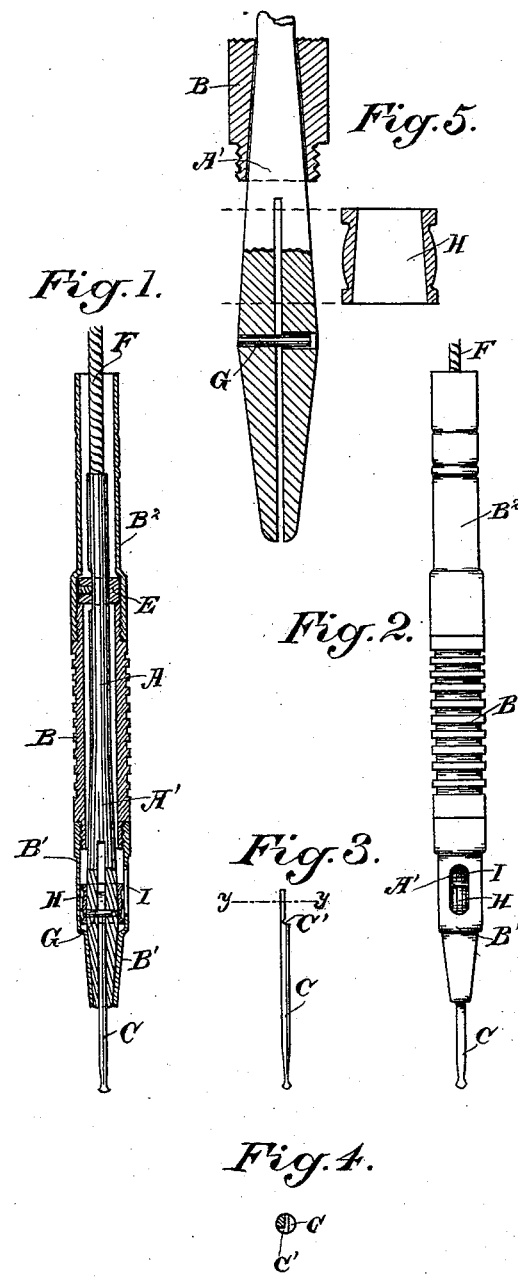

CHARLES O. PERKINS, OF PETALUMA, CALIFORNIA.

HANDPIECE FOR DENTAL ENGINES.

SPECIFICATION forming part of Letters Patent No. 572,310, dated December 1, 1896.

Application filed January 6, 1896. Serial No. 574,450. (No model.)

*To all whom it may concern:*

Be it known that I, CHARLES O. PERKINS, a citizen of the United States, residing at Petaluma, county of Sonoma, State of California, have invented an Improvement in Handpieces for Dental Engines; and I hereby declare the following to be a full, clear, and exact description of the same.

My invention relates to a novel handpiece for dental engines.

It consists, essentially, of a combination of parts whereby the bit or tool is easily introduced and removed with small loss of time and in certain details of construction which will be more fully described in the following specification.

In the accompanying drawings, Figure 1 is a section through the tool. Fig. 2 is an external view of the same. Figs. 3 and 4 are views of the bit. Fig. 5 is an enlarged section of the spindle and sliding ring.

A is a steel spindle having a tapering or conical portion A', extending from near the center and increasing in diameter toward the socket, which receives the tool. This portion has a clamping-ring H, slidable upon it, and is turnable within the central portion B' of the casing. The forward end of the spindle has a hole or socket made in it, adapted to receive the shank of the bit or tool C, and it is split back to a point near the forward end of the casing B when the latter is in position, so that the sides may separate and admit the tool into the socket, after which the ring is moved forward to clamp it securely in place.

B' is that part of the casing which fits over the forward end or point of the chuck, and B² fits over the rear end of the spindle, the two parts B' B² screwing upon the central portion B, so as to unite the whole together and form the handpiece.

The part E is a jam-nut or collar upon the spindle, and so secured as to prevent end motion when the casing has been screwed together. This nut also serves to take up any wear in the tapering portion of the bearing of the spindle A. The rear end of the spindle is connected by soldering or otherwise with the cable F from the engine, by which the spindle and tool are rotated within a handpiece.

The bit C is cut away and flattened upon one side, as shown, having a slot C' made in it at the base of the flattened portion and continued around to one side thereof, so that it is adapted to engage with the pin G. This pin is fixed in one of the sides of the split cone, extends across the slot, and is loose in the other side, and when it has engaged the slot C' the bit may be turned so that the pin will lie in the transverse portion of the slot, and can then be firmly locked in place by the clamping-ring H.

The ring H is exposed through an opening I, made in the side of the forward part B' of the casing, so that by the thumb-nail or any convenient article the ring may be pushed back to allow the chuck to open to receive the shank of the bit.

In order to secure the bit, the sliding ring is first drawn back. The bit is then pushed into the nose of the handpiece entering the chuck and the flat portion passes the transverse pin, so that the latter lies in the slot C' at the base of the flattened or cut-away portion. The bit is then turned a quarter-way around, which brings the transverse pin into the transverse part of the notch in the shank, after which the sliding ring H is pushed forward and the whole is firmly clamped together.

This construction produces a very compact and simple handpiece for dental engines, and a mechanism by which the bits can easily be secured or changed without loss of time, and which also will not readily get out of order.

Having thus described my invention, what I claim as new, and desire to secure by Letters Patent, is—

In a dental handpiece, a rotatable spindle having a longitudinally-split, double-coned socket at the end with the cone-bases together, a pin extending across from one side of the slit to the other, immovably fixed at one end, moving loosely through the other side, and adapted to engage and lock the flattened grooved shank of a tool, a ring slidable upon the inner cone to clamp the tool in place, a casing consisting of a central, and two end sections adapted to screw together, an opening in the front end section through which the sliding ring is movable, and an adjustable collar fixed to the spindle and abutting against the outer end of the central section of the casing.

In witness whereof I have hereunto set my hand.

CHARLES O. PERKINS.

Witnesses:
S. J. HOPKINS,
PHILIP COWEN.